United States Patent [19]

Barth et al.

[11] Patent Number: 4,620,728
[45] Date of Patent: Nov. 4, 1986

[54] FLOWLINE SWIVEL WITH REMOVABLE PRODUCT SEAL SURFACES

[75] Inventors: James R. Barth; Thomas G. A. Choate, both of Houston, Tex.

[73] Assignee: Exxon Production Research Company, Houston, Tex.

[21] Appl. No.: 838,391

[22] Filed: Mar. 5, 1986

Related U.S. Application Data

[63] Continuation of Ser. No. 783,051, Sep. 30, 1985, abandoned, which is a continuation of Ser. No. 565,315, Dec. 27, 1983, abandoned.

[51] Int. Cl.⁴ .............................................. F16L 27/08
[52] U.S. Cl. ...................................... 285/14; 285/98; 285/276
[58] Field of Search ................... 285/276, 281, 14, 98

[56] References Cited

U.S. PATENT DOCUMENTS

| | | | |
|---|---|---|---|
| 3,089,713 | 5/1963 | Scaramucci | 285/14 |
| 3,405,980 | 10/1968 | Stonebraker | 285/276 X |
| 3,434,742 | 3/1969 | Swinney | 285/16 |
| 3,768,840 | 10/1973 | Upton et al. | 285/16 |
| 3,850,454 | 11/1974 | Paddington | 285/98 |
| 3,889,983 | 6/1975 | Freize et al. | 285/13 |
| 4,221,408 | 9/1980 | Lochte et al. | 285/276 |
| 4,229,024 | 10/1980 | Oberrecht et al. | 285/281 X |
| 4,304,310 | 12/1981 | Garrett | 175/195 |
| 4,318,423 | 3/1982 | DeGraff | 137/615 |
| 4,326,736 | 4/1982 | Kusumi et al. | 285/281 |
| 4,355,827 | 10/1982 | Ehret | 285/187 |
| 4,366,973 | 1/1983 | Brekke | 285/276 |
| 4,449,739 | 5/1984 | Raether | 285/14 |
| 4,468,056 | 8/1984 | Kramer et al. | 285/281 |

Primary Examiner—Thomas F. Callaghan
Attorney, Agent, or Firm—M. A. Smith; E. T. Wheelock

[57] ABSTRACT

The present invention relates to a flowline swivel. The swivel is configured so that the product seals are easily replaceable, the included bearing are not exposes to contamination either during use or during replacement of the product seals, and the seal surfaces may be cleaned without disturbing the bearings. The swivel incorporates removable product and environmental seal surfaces.

44 Claims, 12 Drawing Figures

FLOWLINE SWIVEL WITH REMOVABLE PRODUCT SEAL SURFACES

This is a continuation of application Ser. No. 783,051 filed Sept. 30, 1985 now abandoned, which was a continuation of application Ser. No. 565,315 filed Dec. 27, 1983 and now abanonded.

FIELD OF THE INVENTION

The present invention relates to a swivel which may be used in flowing fluid lines often containing petroleum products. The swivel is configured so that product seals are easily replaceable, the included bearings are not exposed to contamination either by the flowing fluid during swivel use or by extraneous material during replacement of the seals, and the seal surfaces may be cleaned without disturbing the bearings.

BACKGROUND OF THE INVENTION

The offshore production of oil and gas requires the use of substantially vertical, fluid-carrying pipes known as "flowlines" to convey fluids from a subsea site to the water surface. Frequently, a number of flowlines are contained in a vertical tension member known as a "riser". The upper end of the riser is connected to a floating vessel or buoy which is subject to angular and lateral movement due to wind, waves, and ocean currents. In some cases, a floating vessel dedicated to the collection of liquid petroleum is anchored in such a way that it is permitted to swing through a complete circle about the top of the riser without restraint. In any event, to compensate for this movement about the stationary subsea riser base, articulated joints are often installed in the riser. Swivels or articulated joints may also be installed in the flowlines to allow the riser to move without damaging the flowlines. For example, one application of swivels in flowlines is disclosed in U.S. Pat. No. 4,318,423 to DeGraaf, issued in 1982.

Swivels in risers and other fluid-carrying systems must be adequately sealed to prevent leakage of the fluids contained therein into the ambient surroundings. Such fluids will hereinafter be referred to "production fluids". Typically, plastic or elastomeric fluid seals are utilized between the moving parts of a swivel to prevent leakage of the production fluid. Although it is desirable that the fluid seals in a fluid carrying system be absolutely reliable over the design life of the system, experience has shown that the seals in such a swivel need be occasionally replaced.

The demands on existing fluid seal technology have increased as the quest for crude oil and gas extends into newly discovered reservoirs in deeper waters. Such reservoirs are often located at depths far below the earth's surface, and fluids from such reservoirs are often produced at high temperatures and pressures. For example, deep gas wells may produce fluids at temperatures higher than 450° F. and pressures exceeding 10,000 lbs. per square inch. In addition, the fluids produced from such reservoirs are frequently sour and contain high concentrations of hydrogen sulfide or other acid gases.

Although fluid seals have been developed which have good resistance to deterioration induced by the action of sour hydrocarbons, these "production seals" tend to deteriorate when subjected to high temperatures and excessive pressures. For example, certain product seal elastomers resistant to chemical deterioration soften as the temperature of the product seal is increased. This softening reduces the tensile strength of the product seal and reduces its ability to resist damage due to excessive pressure. Conversely, other product seal elastomers become brittle at high temperatures. This embrittlement tends to cause the product seal to crack. Furthermore, such embrittlement reduces resiliency of the product seal which thereafter lessens its sealing effectiveness.

Replacement of product seals heretofore has often required complete diassembly of a swivel. Such a disassembly may result in damage to the sealing surfaces since the parts of the swivel having sealing surfaces machined therein are usually quite large and heavy. Consequently, these parts are very bulky and difficult to maneuver; damage to sealing surfaces may result during disassembly and assembly. Furthermore, the included bearings in such a swivel must be removed before machining of the sealing surfaces may be attempted.

Thus, a need clearly exists for a flowline swivel having product seals which are easily replaceable, having sealing surfaces which are removable without also disturbing the swivel bearing, and having a bearing which is protected from the intrusion of production fluids during operation.

SUMMARY OF THE INVENTION

This invention relates to swivels which are desirably usable in subsea petroleum production service and are piggable. The swivels may be either inline or angled.

The swivel is made up of several large parts: a generally nonrotating body flange, a rotatable shaft, and a swivel body which is bolted to the body flange. Located between these rotating and nonrotating parts are a set of roller bearings placed to accept loads imposed on the swivel assembly and a number of seals intended to keep production fluids within the passageway provided for that purpose through the middle of the body flange, shaft, and swivel body and to keep those production fluids out of the bearing area. A bleed port is provided to allow production fluids to escape the swivel rather than contact the bearings and cause a catastrophic failure of the swivel. Other seals intended to keep seawater from entering the bearings are also appropriately positioned between the rotating and nonrotating parts.

One important feature of this invention lies in the use of removable product seal surfaces. These surfaces are positioned so that they may be removed and reconditioned or replaced without removing the bearings or even disturbing the bearing preload.

It is contemplated that in one variation of the invention, an inner removable seal surface is fastened, using cap screws or keys, or other appropriate fasteners, to the rotatable swivel shaft. Another variation entails the placement of an outer removable seal surface in the nonrotating swivel flange. The removable seal surfaces may be cone-shaped or other appropriate shapes. Either seal surface may be used in isolation, however the preferred embodiments use the inner seal surface alone or both the inner and outer seal surfaces.

The seals used in the invention swivel desirably are each of a different diameter. However, the swivel may be designed so that various groups of seals have the same diameters.

DESCRIPTION OF THE PREFERRED EMBODIMENTS

Figure 1A:
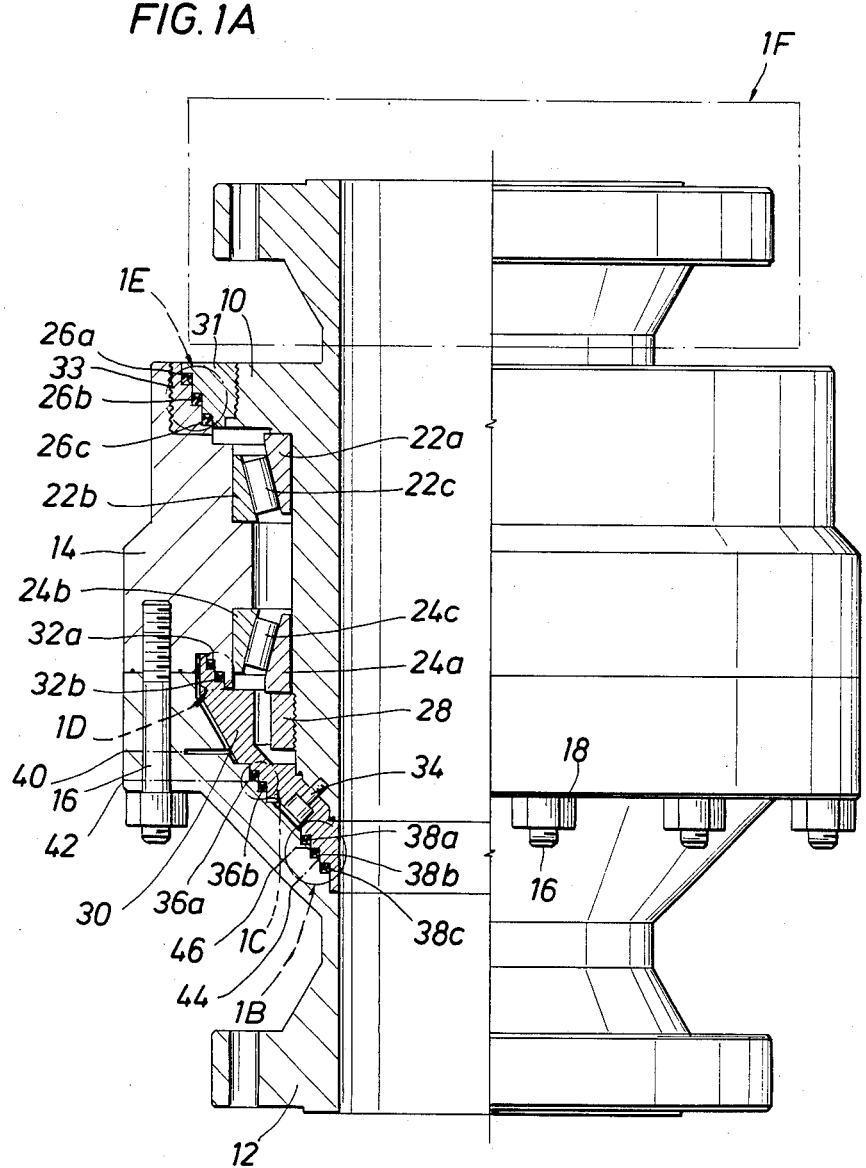
FIG. 1A depicts, in partial cutaway, a side view of an inline swivel made according to the present invention.
Figure 1B:
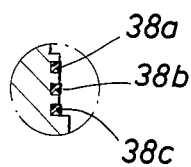
FIGS. 1B through 1E show alternative seal arrangements for the seals used in the variation of FIG. 1A.
Figure 1C:
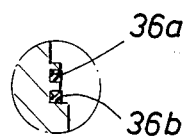
Figure 1D:
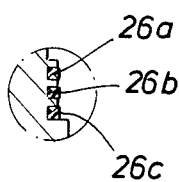
Figure 1E:
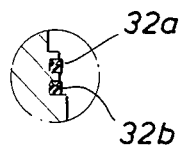
Figure 1F:
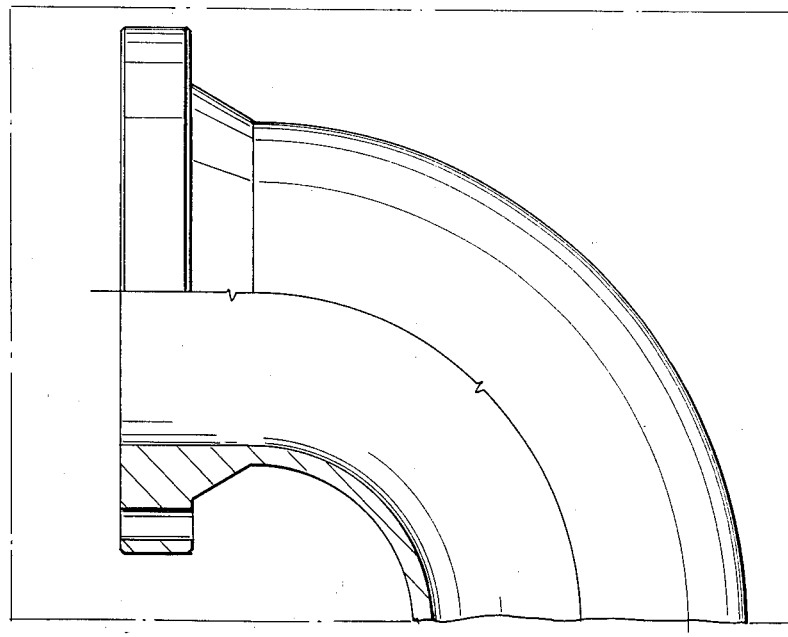
FIG. 1F shows an alternative upper flange assembly for the variation shown in FIG. 1A which converts the swivel to a right angle swivel.

FIG. 1A shows one desirable variation of the present invention. The swivel is made up three large portions: an upper rotatable shaft 10, a lower and generally stationary body flange 12, and a swivel body 14 which is attached to body flange 12 by studs 16 and nuts 18. The upper end of shaft 10 is adapted via an upper connector flange 1F (portion in dotted box) and a similar flange means on the lower end of body flange 12 to attach to the other portions of a tubular member designed to carry production fluids. Production fluids obviously flow through the passageway provided through the middle of shaft 10 and body flange 12.

Shaft 10 is constrained to rotate within swivel body 14 by an upper bearing 22 having inner race 22a, outer race 22b, and rollers 22c, as well as lower bearing 24 having inner race 24a, outer race 24b, and rollers 24c. During assembly of the swivel, upper bearing 22 typically is pressed onto shaft 10 and, after placement of upper environmental seals 26a, 26b, and 26c and swivel body 14, lower bearing 24 is pressed into place with a controlled preload. The environmental seals 26a, 26b, and 26c may be placed between removable inner environmental seal surface 31 and outer environmental seal surface 33. The seal lands may alternatively be machined directly into shaft 10 and swivel body 14. In any event, the bearing preload is maintained by bearing lock ring 28. Bearing lock ring 28 is turned until it contacts the preloaded bearing and then pinned or keyed into position. At this level of subassembly, swivel body 14 should be free to rotate about shaft 10 on the bearings. Middle environmental seals 32a and 32b are placed so that their respective positions are as noted in the drawing. Inner-sealing surface 30 is then inserted into position where it is held in place by screws 34. Multiple cap screws are desirable. Suitable seals, such as "O" rings or gaskets, may be placed beneath the inner-sealing surface 30. Although the drawings shown inner-sealing surface 30 to be generally cone-shaped, this shape is not a requirement of the invention. One having ordinary skills in this art could easily provide other shapes for this portion of the swivel based on the disclosure herein. Lower environmental seals 36a and 36b are placed in position as are product seals 38a, 38b, and 38c. Body flange 12 may then be placed over this assembly and bolted into place by studs 16 and nuts 18, mentioned above.

Body flange 12 has incorporated therein a bleed port 40 (which may have a check or manual valve therein) which connects to a small volume found between the inner surface of body flange 12 and the outer surface of inner-sealing surface 30 between seal 32a and 36a. Port 40 allows leakage of production fluid from the swivel in the event that each of product seals 38a, 38b, and 38c fail. The port prevents seepage of product fluids into the cavity surrounding bearings 22 and 24.

Each of the seal depicted in the drawings is of the type commonly known as a dynamic or lip seal. These seals have a square cross section with a V-shaped notch within that section. The notch often contains a spring which tends to keep the V open and provides some preload to the adjacent sides of the sealing channel. The seals are placed so that the fluid to be excluded contacts the V-side of the seal. Higher differential pressure across the seal tends to spread the seal faces towards their retaining walls and enhances the seal protection. Although these seals are desirable, other known seals may be used as well, e.g., VITON "O" rings and other shapes and materials. In either event, product seals 38a, 38b, and 38c are redundantly positioned to keep production fluids present in the passageway through the middle of the flow-line swivel from seeping out of the swivel. Lower environmental seals 36a and 36b are positioned to keep external liquids, such as sea water, from penetrating into the central swivel during periods when no high pressure production fluid is carried within the swivel. Similarly, middle environmental seals 32a and 32b and upper environmental seals 26b and 26c are positioned to keep seawater out of the bearing area. Upper environmental seal 26a is positioned to allow checking of the integrity of upper environmental seal 26b. Small bleed ports terminating in either check valves or manual valves (not shown) are installed at 42 for checking the integrity of lower environmental seals 36a, at 44 for product seal 38c, and at 46 for product seal 38b. Preferably manual valves are placed at the exits of each of these bleed ports so that a fluid discharge will result when a particular seal becomes ineffective and the valve is opened.

One major feature of the inventive swivel lies in the use of inner-sealing surface 30. As should be apparent, this part is machined to close tolerances and is potentially subject to contact with highly corrosive fluids upon rotation of the swivel. Unlike many other swivels used now and in the past, inner-sealing surface 30 is readily removable by screws 34. In the event that the seal surfaces are damaged by corrosion or assembly errors, the large and bulky shaft 10 need not be machined. It has been calculated that a swivel built according to FIG. 1A for 24 inch gas service would weigh between 10,000 and 12,000 lbs. Consequently, machining a part the size of shaft 10 is not a task to be taken lightly.

Furthermore, removal and replacement of inner-sealing surface 30 does not require removal or disturbance of swivel bearings 22 and 24. Indeed, the bearing preload need not be disturbed. If only product seal replacement is required, bearings 22 and 24 are not even exposed to contamination.

Although not a requirement of this invention, inner 31 and outer environmental seal surfaces 33 may be incorporated in a swivel made according to this invention. This modification enhances the versatility of the device for the same reasons noted above with respect to inner product seal surface 30.

Variations in seal placement are shown in FIGS. 1B, 1C, 1D, and 1E. Placing the seals on a common diameter, while complicating assembly of the swivel, has a number of benefits. The outside diameter of the seal may be decreased thereby saving significant weight. The axial pressures on the swivel, i.e., those tending to separate shaft 10 from body flange 12, upon product seal failure are reduced when the seals are on a common diameter. All or some of the seal sets may be placed on a common diameter as desired.

Similarly, the swivel design shown in FIG. 1A may be modified by replacing upper connector flange 1F with a right angle connector flange to produce a right angle swivel rather than the inline swivel of FIG. 1A.

Figure 2A:
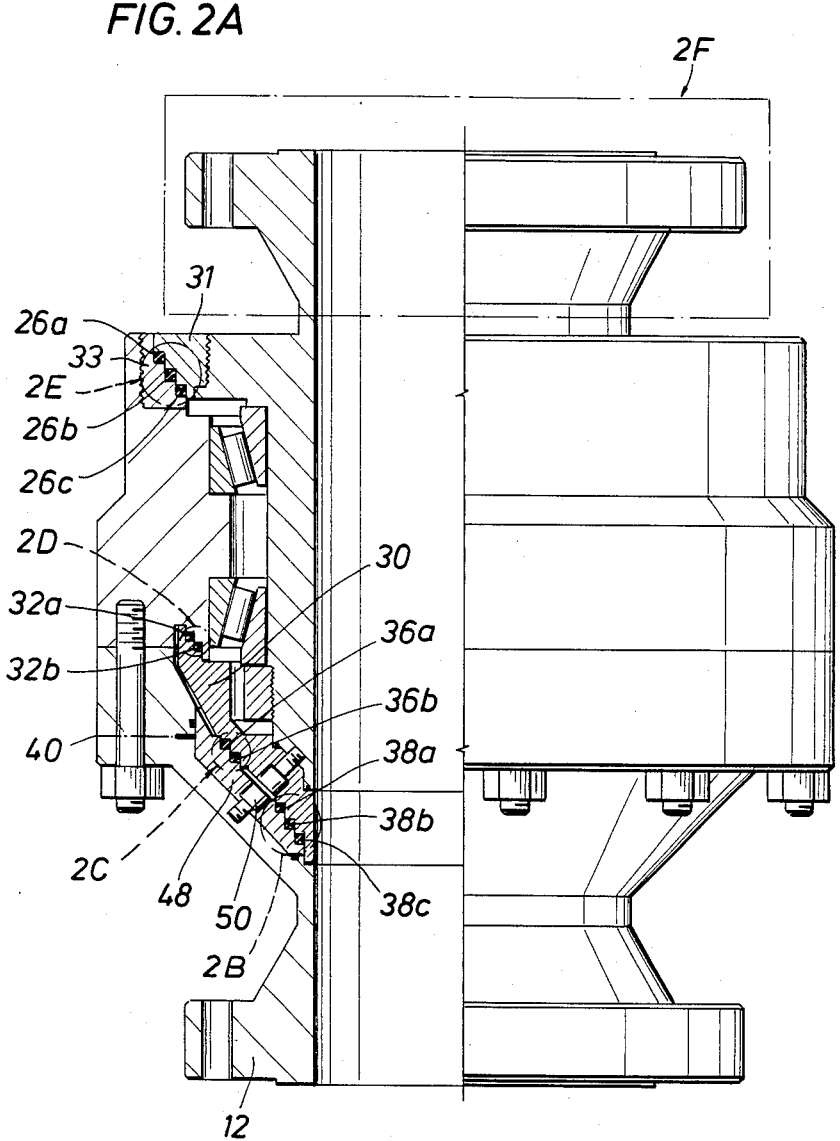
FIG. 2A depicts, in partial cutaway, a side view of an inline swivel made according to the present invention and incorporating completely removable sealing surfaces.
Figure 2B:
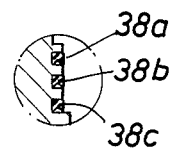
FIGS. 2B to 2E shown alternative seal arrangements for the seals used in the variation of FIG. 2A.
Figure 2C:
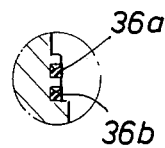
Figure 2D:
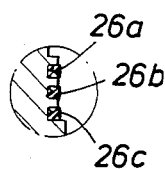

FIG. 2A depicts, in partial cutaway, a side view of another variation of the inventive swivel which is substantially similar to that shown in FIG. 1A. It differs by the addition of an outer removable sealing surface 48 attached by screws 50 to the inside of body flange 12. Again, multiple cap screws or keys may be used to maintain the sealing surface in a set position. Gaskets or seals may be placed beneath outer sealing surface 48. Outer removable sealing surface 48 creates more versatility in the invention in that should the lands where seals 38a, 38b, and 38c are located become corroded or damaged, then body flange 12 need not be machined. As noted above, body flange 12 can be quite heavy. Bleed port 40 is of course retained in this variation.

Figure 2F:
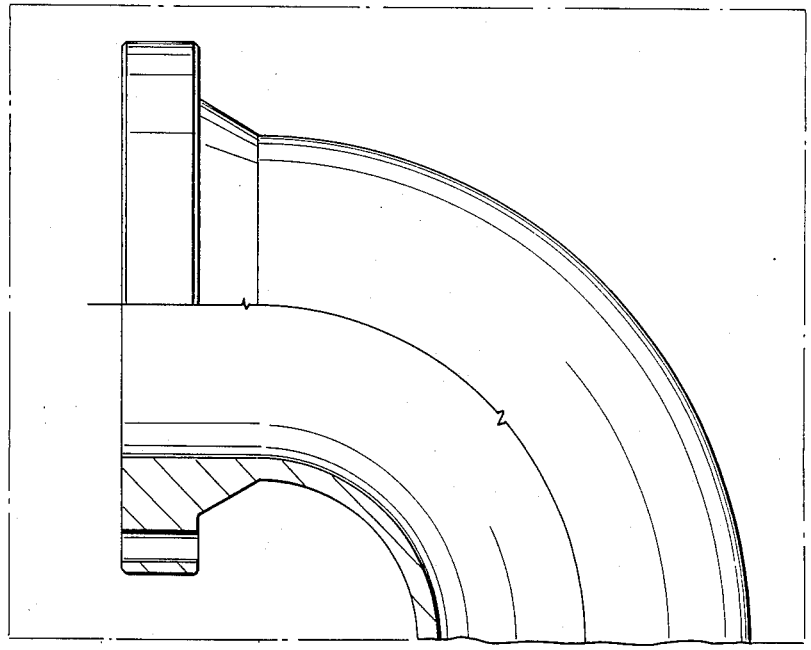
FIG. 2F shows an alternative upper flange assembly for the variation shown in FIG. 2A which converts the swivel to a right angle swivel.
Figure 2E:
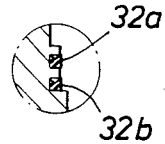

As above, the seal placement shown in FIGS. 2B, 2C, 2D, and 2E may be utilized in the variation of FIG. 2A to decrease the overall diameter of the flow-line swivel. As above, upper connector flange 2F may be modified as shown in FIG. 2F to produce a right angle swivel rather than an inline flow swivel.

The foregoing disclosure and description of the invention are only illustrative and explanatory. Various changes in the size, shape, and materials of construction as well as in the details of the illustrated construction and operation may be made within the scope of the applied claims without departure from the spirit of the invention.

We claim as out invention:

1. A flowline swivel for use in a waterbody comprising:
    a body flange having an upper end, a lower end, a longitudinal axis from said upper end to said lower end, a fluid passageway having said longitudinal axis at its center and passing from the upper end to the lower end, having a removable surface adjacent said upper end and adapted to receive at least one lower environmental seal near said upper end and means to accept at least one product seal near said passageway, and means to removably attach said body flange to a swivel body,
    a generally cylindrical swivel body having a longitudinal axis generally colinear with the axis of said body flange, having an upper end and a lower end and an inner surface, said upper end adapted to accept at least one upper environment seal, a portion of said lower end adapted to accept at least one middle environmental seal and another portion of said lower end adapted to removably attach said swivel body to said body flange, said inner surface adapted to accept outer races of a bearng assembly,
    a generally cylindrical swivel shaft rotatable with respect to said body flange and said swivel body and having an upper end and a lower end and a longitudinal axis substantially colinear with the axes of the body flange and swivel body, a fluid passageway passing from said upper end to said lower end and having the longitudinal axis of the swivel shaft substantially at its center, means located near its upper end adapted to accept said at least one upper environmental seal, an outer surface adapted to accept inner races of a bearing assembly, and means near said swivel shaft lower end to accept a removable inner sealing surface, and
    a removable inner sealing surface removably attached to the swivel shaft and having an inside surface and an outside surface, the outside surface adapted to lie generally flush against said body flange but adapted to accept said at least one product seal and said at least one lower environmental seal, the inside surface adapted to accept said at least one middle environmental seal and engage said rotatable shaft, whereby said at least one product seal is capable of maintaining liquid in said passageway, said at least one lower environmental seal is capable of maintaining liquid from said waterbody out of said passageway and said at least one upper environmental seal and said at least one middle environmental seal are capable of maintaining liquid out of the said bearing assembly.

2. The swivel of claim 1 wherein said means in the body flange for accepting said at least one product seal comprise machined seal lands.

3. The swivel of claim 1 wherein said means in the body flange for accepting at least one product seal comprise a removable outer sealing surface removably attached to said body flange and having an inside surface and an outside surface, the outside surface adapted to lie flush against a portion of said body flange and the inside surface adapted to lie generally flush against the outside surface of said inner sealing surface but adapted to accept said at least one product seal and said at least one lower environmental seal.

4. The swivel of claim 1 additionally comprising at least one bleed port in said body flange connecting the outside of said body flange with its inside above the lower environmental seals.

5. The swivel of claim 3 additionally comprising at least one bleed port in said body flange connecting the outside of said body flange with its inside above said removable outer sealing surface.

6. The swivel of claim 1 additionally comprising flange means on the top end of the shaft and flange means on the lower end of the swivel body flange both adapted to be connected to tubular members.

7. The swivel of claim 1 wherein all said seals are lip seals.

8. The swivel of claim 1 wherein all said seals are 'O' rings.

9. The swivel of claim 1 wherein each set of the at least one upper environmental seal, at least one middle environmental seal, at least one lower environmental seal, and at least one product seal are redundant seals and each set has the same diameter.

10. The swivel of claim 3 wherein each set of the at least one upper environmental seal, at least one middle environmental seal, at least one lower environmental seal, and at least one product seal are redundant seals and each set has the same diameter.

11. The swivel of claim 1 additionally comprising removable inner and outer environmental seal surfaces located between the upper end of said swivel body and the upper end of said swivel shaft and adapted to support and accept said at least one upper environmental seal.

12. An angled flowline swivel for use in a waterbody comprising:
   a body flange having an upper end, a lower end, a longitudinal axis from said upper end to said lower end, a fluid passageway having said longitudinal axis at its center and passing from the upper end to the lower end, having a surface adjacent said upper end and adapted to receive at least one lower environmental seal near said upper end and means to accept at least one product seal near said passageway, and means to removably attach said body flange to a swivel body.
   a generally cylindrical swivel body having a longitudinal axis generally colinear with the axis of said body flange, having an upper end and a lower end and an inner surface, said upper end adapted to accept at least one upper environmental seal, a portion of said lower end adapted to accept at least one middle environmental seal and another portion of said lower end adapted to be removably attach said swivel body to said body flange, said inner surface adapted to accept outer races of a bearing assembly,
   a swivel shaft rotatable with respect to said body flange and said swivel body and having an upper end and a lower end and at least a portion of said upper end angled from the axes of the body flange and the swivel body, a fluid passageway passing from said upper end to said lower end, means located near its upper end adapted to accept said at least one upper environmental seal, an outer surface adapted to accept inner races of bearing assembly, and means near said swivel shaft lower end to accept a removable inner sealing surface, and
   a removable inner sealing surface removably attached to the swivel shaft and having an inside surface and an outside surface, the outside surface adapted to lie generally flush against said body flange but adapted to accept said at least one product seal and said at least one lower environmental seal, the inside surface adapted to accept said at least one middle environmental seal and engage said rotatable shaft,
whereby said at least one product seal is capable of maintaining liquid in said passageway, said at least one lower environmental seal is capable of maintaining liquid from said waterbody out of said passageway and said at least one upper environmental seal and said at least one middle environmental seal are capable of maintaining liquid out of the said bearing assembly.

13. The swivel of claim 12 wherein said means in the body flange for accepting said at least one product seal comprise machine seal lands.

14. The swivel of claim 12 wherein said means in the body flange for accepting at least one product seal comprise a removable outer sealing surface removably attached to said body flange and having an inside surface and outside surface, the outside surface adapted to lie flush against a portion of said body flange and the inside surface adapted to lie generally flush against the outside surface of said inner sealing surface but adapted to accept said at least one product seal and said at least one lower environmental seal.

15. The swivel of claim 12 additionally comprising at least one bleed port in said flange connecting the outside of said body flange with its outside above the lower environmental seals.

16. The swivel of claim 14 additionally comprising at least one bleed port in said body flange connecting the outside of said body flange with its inside above said removable outer seal surface.

17. The swivel of claim 12 additionally comprising flange means on the top end of the shaft and flange means on the lower end of the swivel body flange both adapted to be connected to tubular members.

18. The swivel of claim 12 wherein all said seals are lips seals.

19. The swivel of claim 12 wherein all said seals are 'O' rings.

20. The swivel of claim 12 wherein each set of the at least one upper environmental seal, at least one middle environmental seal, at least one lower environmental seal, and at least one product seal are redundant seals and each set has the same diameter.

21. The swivel of claim 14 wherein each set of the at least one upper environmental seal, at least one middle environmental seal, at least one lower environmental seal, and at least one product seal are redundant seals and each set has the same diameter.

22. The swivel of claim 12 additionally comprising removable inner and outer environmental seal surfaces located between the upper end of said swivel body and the upper end of said swivel shaft and adapted to support and accept said at least one upper environmental seal.

23. A flowline swivel for use in a waterbody comprising:
   a spool shaped body flange having an upper end, a lower end, a longitudinal axis from said upper end to said lower end, a fluid passageway having said longitudinal axis at its center and passing from the upper end to the lower end, having a removable generally cone-shaped surface adjacent said upper end and adapted to receive at least one lower environmental seal near said upper end and means to accept at least one product seal near the intersection of said cone-shaped surface and said passageway, and means to removably attached said body flange to a swivel body.
   a generally cylindrical swivel body having a longitudinal axis generally colinear with the axis of said body flange, having an upper end and a lower end and an inner surface, said upper end adapted to accept at least one upper environmental seal, a portion of said lower end adapted to accept at least one middle environmental seal and another portion of said lower end adapted to removably attached said swivel body to said body flange, said inner surface adapted to accept outer races of a bearing assembly,
   a generally cylindrical swivel shaft rotatable with respect to said body flange and said swivel body and having an upper end and a lower end and a longitudinal axis substantially colinear with the axes of the body flange and swivel body, a fluid passageway passing from said upper end to said lower end and having the longitudinal axis of the swivel shaft substantially at its center, means located near its upper end adapted to accept said at least one upper environmental seal, an outer surface adapted to accept inner races of bearing assembly, and means near said swivel shaft lower end to accept a removable inner sealing surface, and a removable truncated cone-shaped inner sealing surface removably attached to the swivel shaft and having an inside surface and an outside surface, the outside surface adapted to lie generally flush against the cone-shaped in said body flange but adapted to accept said at least one product seal and said at least one lower environment seal, the inside surface adapted to accept said at least one middle environmental seal and engage said rotatable shaft, whereby said at least one product seal is capable of maintaining liquid in said passageway, said at least one lower environmental seal is capable of maintaining liquid from said waterbody out of said passageway and said at least one upper environmental seal and said at least one middle environmental seal are capable of maintaining liquid out of the said bearing assembly.

24. The swivel of claim 23 wherein said means in the body flange for accepting said at least one product seal comprise machined seal lands.

25. The swivel of claim 23 wherein said means in the body flange for accepting at least one product seal comprise a removable truncated cone-shaped outer sealing surface removably attached to said body flange and having an inside surface and an outside surface, the outside surface adapted to lie flush against a portion of the cone-shaped surface or said body flange and the inside surface adapted to lie generally flush against the outside surface of said inner sealing surface but adapted to accept said at least one product seal and said at least one lower environmental seal.

26. The swivel of claim 23 additionally comprising at least one bleed port in said body flange connecting the outside of said body flange with the cone-shaped surface above the lower environmental seals.

27. The swivel of claim 25 additionally comprising at least one bleed port in said body flange connecting the outside of said body flange with the cone-shaped surface above said removable outer sealing surface.

28. The swivel of claim 23 additionally comprising flange means on the to end of the shaft and flange means on the lower end of the swivel body flange both adapted to be connected to tubular members.

29. The swivel of claim 23 wherein all said seals are lip seals.

30. The swivel of claim 23 wherein all said seals are 'O' rings.

31. The swivel of claim 23 wherein each set of the at least one upper environmental seal, at least one middle environmental seal, at least one lower environmental seal, and at least one product seal are redundant seals and each set has the same diameter.

32. The swivel of claim 25 wherein each set of the at least one upper environmental seal, at least one middle environmental seal, at least one lower environmental seal, and at least one product seal are redundant seals and each set has the same diameter.

33. The swivel of claim 23 additionally comprising removable inner and outer environmental seal surfaces located between the upper end of said swivel body and the upper end of said swivel shaft and adapted to support and accept said at least one upper environmental seal.

34. An angled flowline swivel for use in a waterbody comprising:
a spool-shaped body flange having an upper end, a lower end, a longitudinal axis of from said upper end to said lower end, a fluid passageway having said longitudinal axis at its center and passing from the upper end to the lower end, having a generally cone-shaped surface adjacent said upper end and adapted to receive at least one lower environmental seal near said upper end and means to accept at least one product seal near the intersection of said cone-shaped surface and said passageway, and means to removably attach said body flange to a swivel body.
a generally cylindrical swivel body having a longitudinal axis generally colinear with the axis of said body flange, having an upper end and a lower end and an inner surface, said upper surface adapted to accept at least one upper environmental seal, a portion of said lower end adapted to accept at least one middle environmental seal and another portion of said lower end adapted to be removably attach said swivel body to said body flange, said inner surface adapted to accept outer races of a bearing assembly,
a swivel shaft rotatable with respect to said body flange and said swivel body and having an upper end and a lower end and at least a portion of said upper end angled from the axes of the body flange and the swivel body, a fluid passageway passing from said upper end to said lower end, means located near its upper end adapted to accept said at least one upper environmental seal, an outer surface adapted to accept inner races of bearing assembly, and means near said swivel shaft lower end to accept a removable inner sealing surface, and
a removable truncated cone-shaped inner sealing surface removable attached to the swivel shaft and having an inside surface and an outside surface, the outside surface adapted to lie generally flush against the cone-shaped in said body flange but adapted to accept said at least one product seal and said at least one lower environmental seal, the inside surface adapted to accept said at least one middle environmental seal and engage said rotatable shaft,
whereby said at least one product seal is capable of maintaining liquid in said passageway, said at least one lower environmental seal is capable of maintaining liquid from said waterbody out of said passageway and said at least one upper environmental seal and said at least one middle environment seal are capable of maintaining liquid out of the said bearing assembly.

35. The swivel of claim 34 wherein said means in the body flange for accepting said at least one product seal comprise machined seal lands.

36. The swivel of claim 34 wherein said means in the body flange for accepting at least one product seal comprise a removable truncated cone-shaped outer sealing surface removably attached to said body flange and having an inside surface and an outside surface, the outside surface adapted to lie flush against a portion of the cone-shaped surface on said body flange and the inside surface adapted to lie generally flush against the outside surface of said inner sealing surface but adapted to accept said at least one product seal and said at least one lower environmental seal.

37. The swivel of claim 34 additionally comprising at least one bleed port in said body flange connecting the outside of said body flange with the cone-shaped surface above the lower environmental seals.

38. The swivel of claim 36 additionally comprising at least one bleed port in said body flange connecting the outside of said body flange with the cone-shaped surface above said removable outer sealing surface.

39. The swivel of claim 34 additionally comprising flange means on the top end of the shaft and flange means on the lower end of the swivel body flange body adapted to be connected to tubular members.

40. The swivel of claim 34 wherein all said seals are lip seals.

41. The swivel of claim 34 wherein all said seals are 'O' rings.

42. The swivel of claim 34 wherein each set of the at least one upper environmental seal, at least one middle environmental seal, at least one lower environmental seal, and at least one product seal are redundant seals and each set has the same diameter.

43. The swivel of claim 36 wherein each set of the at least one upper environmental seal, at least one middle environmental seal, at least one lower environmental seal, and at least one product seal are redundant seals and each set has the same diameter.

44. The swivel of claim 34 additionally comprising removable inner and outer environmental seal surfaces located between the upper end of said swivel body and the upper end of said swivel shaft and adapted to support and accept said at least one upper environmental seal.

* * * * *